United States Patent [19]

Diana

[11] Patent Number: 4,525,596
[45] Date of Patent: Jun. 25, 1985

[54] DAMPING SPACER FOR BUNDLE CONDUCTORS OF HIGH-VOLTAGE ELECTRIC LINES, WITH IMPROVED DAMPING EFFECTIVENESS

[75] Inventor: Giorgio Diana, Milan, Italy

[73] Assignee: A. Salvi & C. S.p.A., Milan, Italy

[21] Appl. No.: 556,046

[22] Filed: Nov. 29, 1983

[30] Foreign Application Priority Data

Nov. 30, 1982 [IT] Italy ................................ 24501 A/82

[51] Int. Cl.³ .......................... H02G 7/14; H02G 7/12
[52] U.S. Cl. ........................................ 174/42; 174/146
[58] Field of Search .................................. 174/42, 146

[56] References Cited

FOREIGN PATENT DOCUMENTS 403901 6/1966 Switzerland ........................... 174/42

Primary Examiner—Laramie E. Askin
Attorney, Agent, or Firm—Robbins & Laramie

[57] ABSTRACT

The invention concerns a damping spacer for bundle conductors of high-voltage electric lines, which comprises a stiff central body (1), at least two connecting clamps (3) each for anchoring to a respective conductor of the bundle, each clamp having a rigid extension (2), and at least one springing hinge element for connecting the extension (2) to the stiff body (1). Rigid arms (4), carrying at their ends inertial masses (5), are fixedly connected to the central body (1), said masses being so arranged that their barycenters are far from the barycenter of the central body (1), beyond the axes of said springing hinges.

6 Claims, 2 Drawing Figures

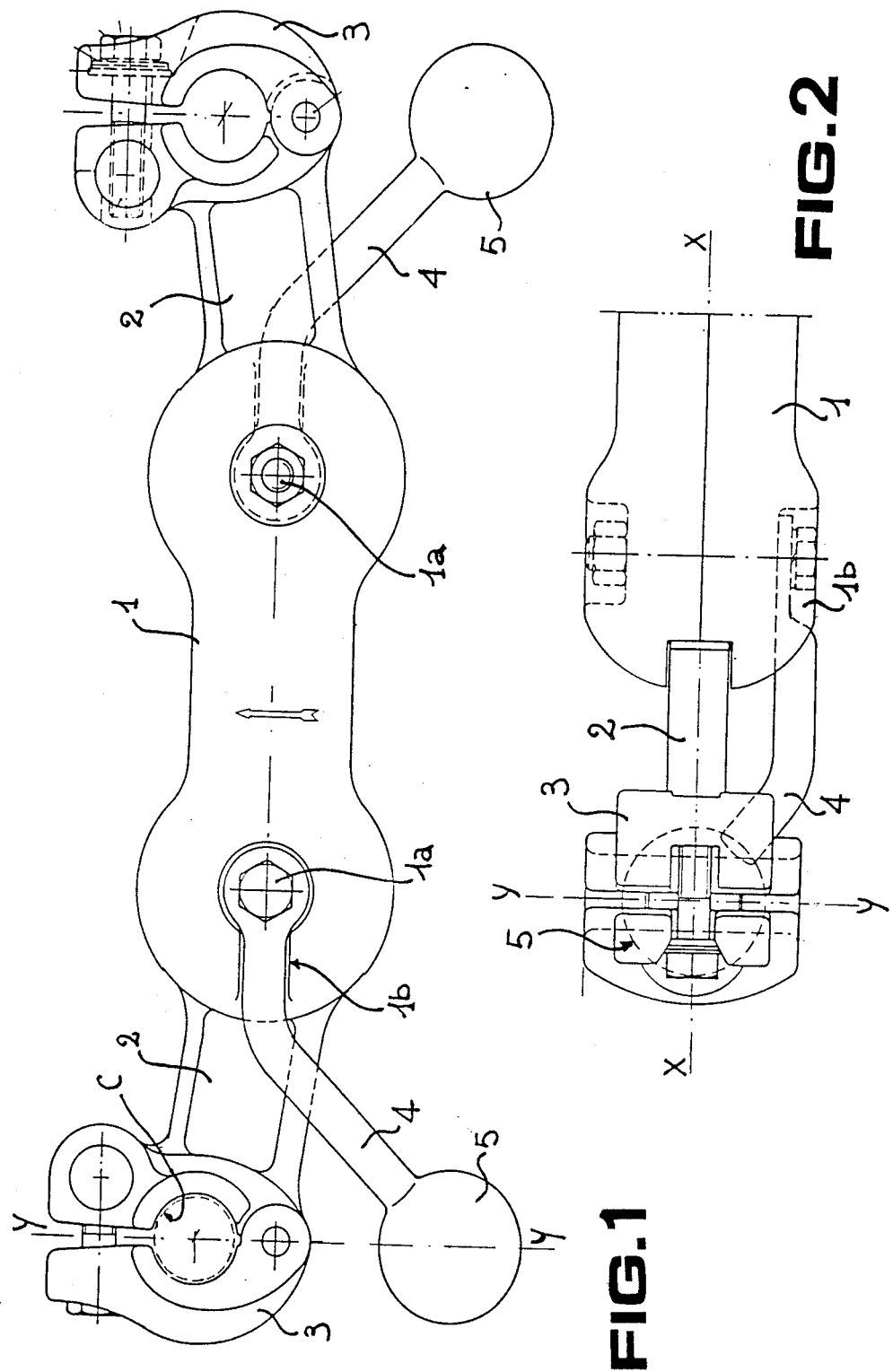

4,525,596

DAMPING SPACER FOR BUNDLE CONDUCTORS OF HIGH-VOLTAGE ELECTRIC LINES, WITH IMPROVED DAMPING EFFECTIVENESS

BACKGROUND OF THE INVENTION

As known, the use of conductor bundles for high-voltage electric lines determines the need to dispose spacing elements—at regular intervals along the line—between the elementary conductors of a same bundle, so as to prevent said bundles from intersecting, or at least from overlapping.

Such a drawback may be determined by relative movements of one conductor with respect to the other—deriving from different elongations, from the action of the wind, from breaking loose of ice or snow muffs, or from the external mechanical forces—as well as by electrodynamic effect of mutual attraction, deriving from the short circuit currents whicy may occur on the line.

Spacers designed to connect the sub-conductors of a same bundle should hence satisfy two opposite requirements: on one hand, they must be sufficiently flexible, so as not to damage the conductors at the connection point when they are subjected to normal stresses; on the other hand, they must be sufficiently stout in order to withstand, without undergoing permanent deformation, the compressive stresses deriving from the electrodynamic effect of short circuit currents.

Several types of spacers, capable of performing this double function, are already known. Among these, there is, for example, the spacer described in Italian Pat. No. 834,619.

An important improvement of such spacers has been realized with the so-called "damping spacers", for instance of the type described in U.S. Pat. No. 3,582,983. This patent actually illustrates a structure which—as well as performing the described function of keeping the sub-conductors of the bundle separated and spaced, with a differentiated behavior according to the stresses to which the conductors are subjected—is able to perform a function of dampening the oscillations produced on said conductors by the action of the wind.

The spacer described in this patent has a deformable elastic structure, anchored to the conductors of the bundle through connecting clamps, wherein said clamps comprise rigid extensions, the free ends of which are associated to a stuff central body through at least one springing hinge element. Each hinge element has structural characteristics such as to dissipate energy when subjected to oscillations, in order to accomplish the desired dampening of said oscillations.

In the cited U.S. Pat. No. 3,582,983, each hinge element simply consists of a short length of wire rope, the ends of which are firmly fixed onto the rigid parts which it has to connect. The oscillation energy is dissipated due to the sliding friction between the single strands of the wire rope length.

Other types of damping spacers are described in U.S. Pat. Nos. 3,748,370 and 3,784,723; these in turn comprise a central stiff body, to which the rigid extensions of the connecting clamps are connected by way of springing hinges. Said hinges consist of a pair of mutually rotating elements, between which are interposed rubber pads, which get compressed on rotation—even to a slight extent—of one element with respect to the other, due to oscillation of the clamps with respect to the stiff central body.

Also, the damping spacer described in the Italian patent application No. 22559 A/82, in the name of the same Applicant—the description of which should be referred to for further details of the heretofore specified known technique—comprises springing hinges, incorporating rubber elements. In this structure, however, the rubber elements are not subjected to compressive stresses, but rather to shearing stresses.

In the first as well as in the second case, to the elastic deformation of the rubber elements—produced by the oscillations to which the hinges are subjected—there is associated a dissipation of energy, deriving from the mechanical hysteresis of said rubber elements, and to this dissipation of energy corresponds the desired damping of the oscillations.

All such known devices, though considered fairly efficient for the normal uses foreseen, have however evidenced—in the course of accurate tests—a very low damping force in the event of the bundle of conductors being subjected to low frequency oscillation movements and/or to torsional oscillation movements. In fact, in these cases—and particularly when a so-called "twin-wire" bundle is involved—the stiff central body of the spacer tends to follow the low frequency oscillation or the torsion of the bundle, determining only slightest deformations in correspondence of the hinges and thus very low dampening effect.

SUMMARY OF THE INVENTION

The object of the present invention is to eliminate these drawbacks and to realize a spacer with a structure allowing to obtain a satisfactory damping even in the case of low frequency or torsional oscillations.

This result is achieved essentially owing to the fact that the stiff central body of the spacer has a high moment of inertia obtained, without considerable weight increase, by associating to said stiff central body, far from its barycenter, inertial masses rigidly connected thereto.

According to a preferred embodiment, in a damping spacer structure of the type having a stiff central body and hinge elements incorporating deformable rubber pads—for instance as described in the already cited Italian patent application No. 22559 A/82—the increase of the moment of inertia is obtained by fixing inertial masses, preferably spherical, to one end of rigid arms, the other end of which is fixed to the stiff central body, the barycenter of each inertial mass being placed, far from the barycenter of the stiff central body, beyond the axis of the hinges.

BRIEF DESCRIPTION OF THE DRAWINGS

Further characteristics and advantages of the structure according to the present invention will be more evident from the following description of a preferred embodiment, illustrated by way of example in the accompanying drawing, in which:

FIG. 1 is a diagrammatic side view of a damping spacer, to be used in a "twin-wire" bundle; and FIG. 2 is a plan view of one of the two extremities of said spacer.

DESCRIPTION OF THE PREFERRED EMBODIMENTS

As said, the drawing illustrates the embodiment of a spacer to be used with a "twin-wire" bundle. This embodiment has been chosen, on one hand, because it places more in evidence the problems concerning the dampening of low frequency and/or torsional oscillations, with respect to bundles with more than two conductors and, on the other hand, because this is the simplest form of spacer and a technician in the field may, without any difficulty, transfer the teachings deriving therefrom to bundles with more than two conductors.

The illustrated spacer comprises a stiff central body 1, whose shape substantially corresponds to that of the central body of the spacer described in the heretofore cited Italian patent application No. 22559 A/82; said body therefore has an elongated shape, with enlarged end portions incorporating springing hinges with rubbers pads subjected to shearing stresses.

On the hinge axes $1a$ are mounted oscillatingly the extensions 2 of the clamps 3 for connection to the conductors C (shown by a dashed line).

According to the invention, on the hinge axes $1a$ are also mounted the rigid arms 4, carrying at their free ends inertial masses 5, of preferably spherical shape.

Each arm 4 is anchored at a hinge axis $1a$ and is furthermore housed, with its end portion connected to said hinge, into a recess $1b$ of the stiff body 1; said recess preventing rotation of the arm about the axis $1a$, thereby making it rigidly connected to the body 1 itself.

The arms 4 project outwardly from the body 1, so that the barycenters of the inertial masses 5 are well beyond the axis of the corresponding hinge, with respect to the barycenter of the body 1. Preferably, the lengths of the arms 4 are such that the barycenters of the masses 5 lie substantially on the vertical planes Y—Y crossing the axes of the conductors C. Also preferably, the arms 4 are curved from the outside towards the center of the body 1, so that the barycenters of the masses 5 lie—as clearly shown in FIG. 2—substantially on the median vertical plane X—X of the stiff body 1.

Having obtained, with this structure, a considerable increase in the moment of inertia of the spacer as a whole, without however increasing its weight to an undesirable extent, it has been possible to ascertain that, in the presence of low frequency and/or torsional oscillations—during which the spacers of known techniques tend to rigidly follow the movement of the conductors, without producing any oscillation of the hinges—the spacer according to the invention behaves in a fully efficient manner: the stiff body 1, because of its high moment of inertia, tends to keep its initial rest position and the oscillations of the conductors—even low frequency or torsional oscillations—turn into an oscillation of the extensions 2 with respect to the body 1, with deformation of the rubber elements of the hinges and consequent effective damping action.

It is to be understood that the invention is by no means limited to the embodiment illustrated, which has been given by mere way of example, but that there may be various other embodiments differing from the same, all within reach of a technician in the field and hence all falling within the scope of the invention itself. In particular, as already said, the invention should not be limited to spacers for "twin-wire" bundles, and even less to the use of a spacer as that described in the Italian patent application No. 22559 A/82; this latter has in fact been cited merely to facilitate the understanding of the invention, whose fundamental characteristics should instead be considered as applicable to any other type of spacer of known technique, and in particular to the spacers described in the other patents cited in the introductory part of this specification.

I claim:

1. Damping spacer for bundle conductors of high-voltage electric lines comprising a stiff central body and at least two connecting clamps, each for anchoring to a respective sub-conductor of the bundle, each clamp having a rigid extension connected, through at least one springing or elastically deformable hinge element, to said stiff central body, characterized in that, inertial masses are rigidly associated to said central body, the barycenters of the masses being far from the barycenter of the central body.

2. Damping spacer as in claim 1, comprising rigid arms fixedly connected to the central body and outwardly projecting therefrom, carrying at the ends said inertial masses.

3. Damping spacer as in claim 1, wherein the barycenters of said inertial masses are placed, with respect to the barycenter of said stiff central body, beyond the axes of said springing or elastically deformable hinge elements.

4. Damping spacer as in claim 1, wherein the barycenters of said inertial masses lie substantially on the vertical plane crossing the axis of the corresponding sub-conductor.

5. Damping spacer as in claim 1, wherein the barycenters of said inertial masses lie substantially on the median vertical plane of said central body.

6. Damping spacer as in claim 1, wherein said inertial masses each have a substantially spherical configuration.

* * * * *